US012603491B2

(12) United States Patent
Nejadpak et al.

(10) Patent No.: US 12,603,491 B2
(45) Date of Patent: Apr. 14, 2026

(54) GALLIUM NITRIDE-BASED ACTIVE CURRENT FLOWBACK PREVENTION

(71) Applicant: Blue Origin Manufacturing, LLC, Huntsville, AL (US)

(72) Inventors: Arash Nejadpak, Everett, WA (US); Jeffery Paul Mendow, Abita Springs, LA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 23 days.

(21) Appl. No.: 18/391,443

(22) Filed: Dec. 20, 2023

(65) Prior Publication Data

US 2025/0210965 A1 Jun. 26, 2025

(51) Int. Cl.
H02H 3/16 (2006.01)
H02H 1/00 (2006.01)
H02H 7/22 (2006.01)

(52) U.S. Cl.
CPC ............ H02H 3/16 (2013.01); H02H 1/0007 (2013.01); H02H 7/22 (2013.01)

(58) Field of Classification Search
CPC .......... H02H 3/16; H02H 1/0007; H02H 7/22; H02H 3/003; H02H 3/18
See application file for complete search history.

(56) References Cited

U.S. PATENT DOCUMENTS

| | | | |
|---|---|---|---|
| 8,742,628 B2 | 6/2014 | Urciuoli | |
| 9,240,736 B2 | 1/2016 | Shimomugi et al. | |
| 9,531,250 B2 | 12/2016 | Arisawa et al. | |
| 9,787,246 B2 | 10/2017 | Tsumura et al. | |
| 11,329,596 B2 | 5/2022 | Rice et al. | |
| 2021/0328502 A1 | 10/2021 | Chen et al. | |

(Continued)

FOREIGN PATENT DOCUMENTS

| | | |
|---|---|---|
| CN | 209462011 U | 10/2019 |
| CN | 112886542 A | 6/2021 |
| WO | WO 2021180580 A1 | 9/2021 |

OTHER PUBLICATIONS

Mejia-Ruiz, Gabriel E., et al. "A novel GaN-based solid-state circuit breaker with voltage overshoot suppression." *IEEE Transactions on Industrial Electronics* 69.9 (2021): 8949-8960.

(Continued)

*Primary Examiner* — Scott Bauer
(74) *Attorney, Agent, or Firm* — Knobbe Martens Olson & Bear LLP

(57) ABSTRACT

An improved current flowback prevention device that uses a Gallium Nitride (GaN) device or transistor to mitigate the effects of short circuits is described herein. For example, a GaN device may have an ideal diode-like behavior during reverse conduction. This characteristic of the GaN device can be used to protect electrical systems against short circuit incidents caused by upstream circuits or electronic components. As an illustrative example, a power regulator may be injecting current towards a direct current (DC) bus. While the power regulator is operating normally, the gate of the GaN device may be kept high to allow current to pass through the GaN device from the power regulator to the DC bus. If a short circuit event occurs, the gate of the GaN device may no longer receive a high signal and prevent current from passing through the GaN device.

20 Claims, 5 Drawing Sheets

100

(56) References Cited

U.S. PATENT DOCUMENTS

| | | | |
|---|---|---|---|
| 2022/0029362 A1 | 1/2022 | Shen et al. | |
| 2022/0094284 A1 | 3/2022 | Ishizaki et al. | |
| 2022/0166206 A1 | 5/2022 | Beckert et al. | |
| 2022/0182048 A1 | 6/2022 | Liu | |
| 2022/0190592 A1* | 6/2022 | Fukuno | H02H 3/18 |
| 2022/0278523 A1 | 9/2022 | Wang et al. | |
| 2022/0328270 A1* | 10/2022 | Namuduri | H02H 7/122 |
| 2023/0074777 A1 | 3/2023 | Song et al. | |
| 2024/0222952 A1* | 7/2024 | Chambon | H03K 17/18 |

OTHER PUBLICATIONS

Advanced Circuit Breakers for Next-Generation Electric Vehicles— Creare. Retrieved Mar. 22, 2023 from https://www.creare.com/ advanced-circuit-breakers-for-mext-generation-electric-vehicles/.

* cited by examiner

_400_

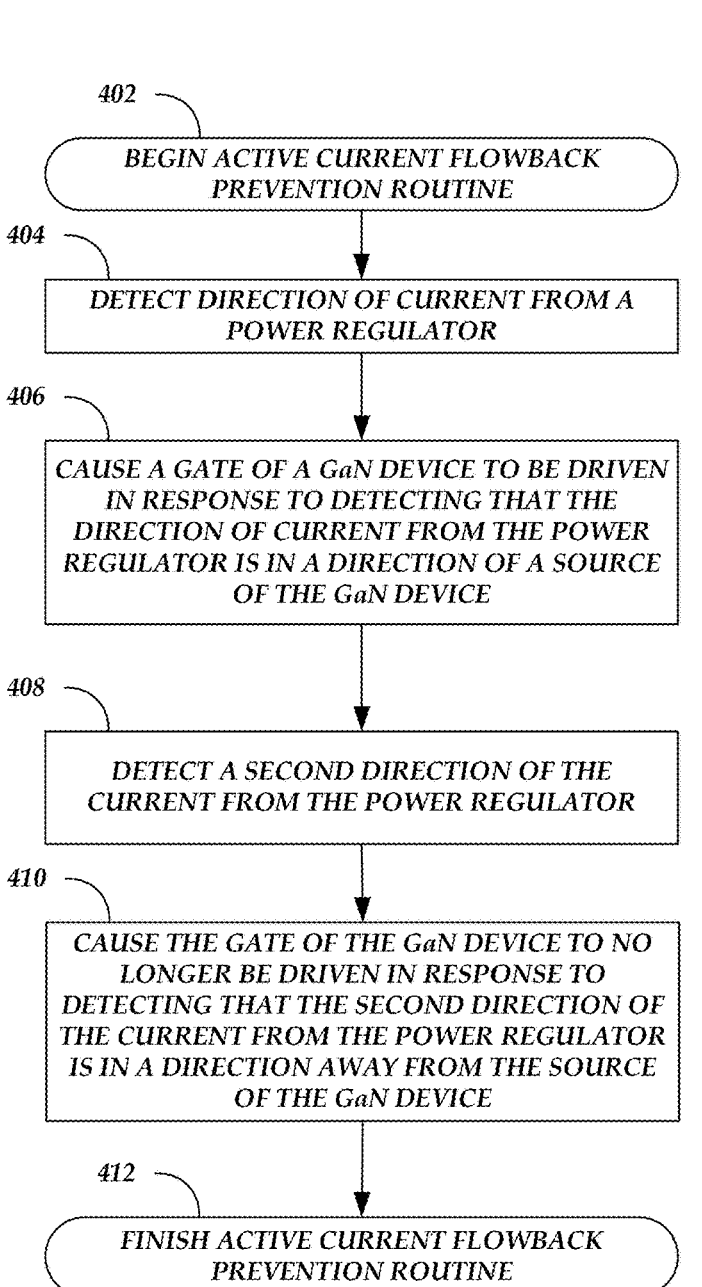

_402_

BEGIN ACTIVE CURRENT FLOWBACK
PREVENTION ROUTINE

_404_

DETECT DIRECTION OF CURRENT FROM A
POWER REGULATOR

_406_

CAUSE A GATE OF A GaN DEVICE TO BE DRIVEN
IN RESPONSE TO DETECTING THAT THE
DIRECTION OF CURRENT FROM THE POWER
REGULATOR IS IN A DIRECTION OF A SOURCE
OF THE GaN DEVICE

_408_

DETECT A SECOND DIRECTION OF THE
CURRENT FROM THE POWER REGULATOR

_410_

CAUSE THE GATE OF THE GaN DEVICE TO NO
LONGER BE DRIVEN IN RESPONSE TO
DETECTING THAT THE SECOND DIRECTION OF
THE CURRENT FROM THE POWER REGULATOR
IS IN A DIRECTION AWAY FROM THE SOURCE
OF THE GaN DEVICE

_412_

FINISH ACTIVE CURRENT FLOWBACK
PREVENTION ROUTINE

_Fig. 4_

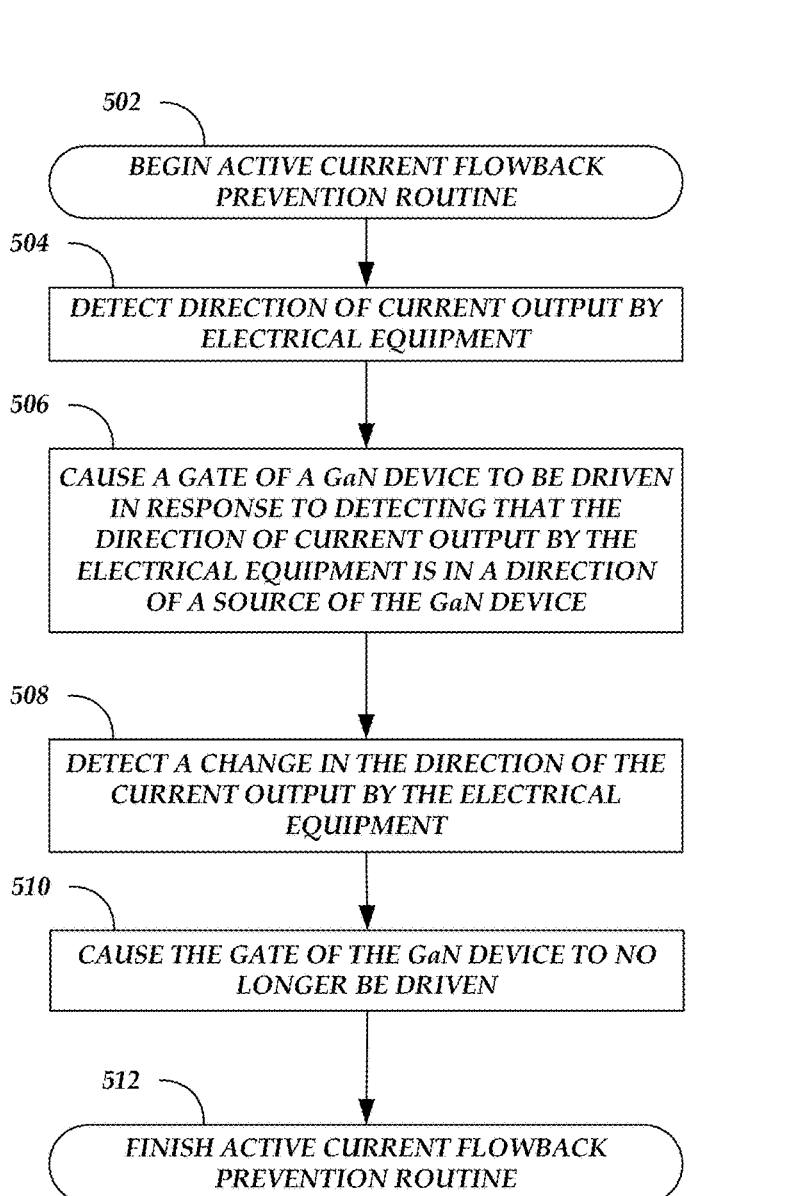

*500*

502
BEGIN ACTIVE CURRENT FLOWBACK
PREVENTION ROUTINE

504
DETECT DIRECTION OF CURRENT OUTPUT BY
ELECTRICAL EQUIPMENT

506
CAUSE A GATE OF A GaN DEVICE TO BE DRIVEN
IN RESPONSE TO DETECTING THAT THE
DIRECTION OF CURRENT OUTPUT BY THE
ELECTRICAL EQUIPMENT IS IN A DIRECTION
OF A SOURCE OF THE GaN DEVICE

508
DETECT A CHANGE IN THE DIRECTION OF THE
CURRENT OUTPUT BY THE ELECTRICAL
EQUIPMENT

510
CAUSE THE GATE OF THE GaN DEVICE TO NO
LONGER BE DRIVEN

512
FINISH ACTIVE CURRENT FLOWBACK
PREVENTION ROUTINE

*Fig. 5*

GALLIUM NITRIDE-BASED ACTIVE CURRENT FLOWBACK PREVENTION

TECHNICAL FIELD

The present disclosure generally relates to a Gallium Nitride device that can be used to protect electronic components from short circuit events.

BACKGROUND

A short circuit event can result in damage to electronic equipment. For example, if a circuit or electronic equipment malfunctions, it may create a short circuit. As a result, a high amount of current may flow towards another circuit or electronic equipment (e.g., a load) downstream from the malfunctioning circuit or electronic equipment. Often, the amount of current flowing towards the load exceeds the normal operating current levels for which the load has been designed. In some cases, the amount of current that flows toward a load during a short circuit event can exceed the normal operating current levels by several orders of magnitude and/or within a short period of time. Excessive current flowing towards the load can cause the load to overheat, combust, and/or otherwise render the load inoperable for its intended use.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a system for preventing current flowback. The system comprises a Gallium Nitride (GaN) device comprising a source, a drain, and a gate. The system further comprises electrical equipment, wherein an output of the electrical equipment is coupled to the source of the GaN device. The system further comprises a latch, wherein an output of the latch is coupled to the gate of the GaN device. The system further comprises a current sense circuit, wherein an output of the current sense circuit is coupled to a first input of the latch, wherein an input of the current sense circuit is coupled to the output of the electrical equipment and the source of the GaN device, and wherein the current sense circuit is configured to: detect a direction of current output by the electrical equipment, and cause the latch to output a low signal that causes the GaN device to prevent a flow of current from the drain of the GaN device to the source of the GaN device in response to detecting that the direction of current output by the electrical equipment is from the source of the GaN device to the output of the electrical equipment.

The system of the preceding paragraph can include any sub-combination of the following features: where the gate drive circuit is coupled between the output of the latch and the gate of the GaN device, wherein the gate drive circuit is configured to amplify the low signal output by the latch and output the amplified low signal to the gate of the GaN device; where the latch further comprises an enable input, and wherein the current sense circuit is further configured to output a high signal to the enable input of the latch and to output a second low signal to the first input of the latch; where the current sense circuit is further configured to: detect that a second direction of the current output by the electrical equipment is from the output of the electrical equipment to the source of the GaN device at a first time before a time at which the direction of the current is detected, and cause the latch to drive the gate of the GaN device, wherein driving the gate of the GaN device causes the GaN device to allow the current to flow from the source of the GaN device to the drain of the GaN device; where the drain of the GaN device is coupled to a high voltage distribution box; where the low signal has a voltage level that falls below a threshold voltage level; where the electrical equipment comprises a power regulator; where the power regulator comprises a fuel cell power regulator; and where the system is comprised within one of a spacecraft, an automobile, a train, a plane, or a ship.

Another aspect of the disclosure provides a method for preventing current flowback. The method comprises: detecting a first direction of current from a power regulator, wherein an output of the power regulator is coupled to a source of a Gallium Nitride (GaN) device; causing a gate of the GaN device to be driven in response to detecting that the direction of current from the power regulator is in a direction of the source of the GaN device; detecting a second direction of the current from the power regulator; and causing the gate of the GaN device to no longer be driven in response to detecting that the second direction of the current from the power regulator is in a direction away from the source of the GaN device.

The method of the preceding paragraph can include any sub-combination of the following features: where causing the gate of the GaN device to no longer be driven further comprises causing a latch coupled to the gate of the GaN device to output a low signal below a threshold voltage level; where causing a latch coupled to the gate of the GaN device to output a low signal further comprises causing a gate drive circuit coupled between the output of the latch and the gate of the GaN device to amplify the low signal output by the latch and output the amplified low signal to the gate of the GaN device; where causing a gate of the GaN device to be driven further comprises outputting a high signal to an enable input of a latch and outputting the high signal to a second input of the latch; where the latch is configured to output the high signal to the gate of the GaN device; where a drain of the GaN device is coupled to a high voltage distribution box; where the power regulator comprises a fuel cell power regulator; and where the power regulator and the GaN device are comprised within one of a spacecraft, an automobile, a train, a plane, or a ship.

Another aspect of the disclosure provides a method for preventing current flowback. The method comprises: detecting a direction of current output by electrical equipment, wherein an output of the electrical equipment is coupled to a source of a Gallium Nitride (GaN) device; causing a gate of the GaN device to be driven in response to detecting that the direction of the current output by the electrical equipment is in a direction of the source of the GaN device; detecting a change in the direction of the current output by the electrical equipment; and causing the gate of the GaN device to no longer be driven.

The method of the preceding paragraph can include any sub-combination of the following features: where causing the gate of the GaN device to no longer be driven further comprises causing a latch coupled to the gate of the GaN device to output a low signal below a threshold voltage level; and where the electrical equipment and the GaN device are comprised within one of a spacecraft, an automobile, a train, a plane, or a ship.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 4 is a flow diagram depicting an example active current flowback prevention routine illustratively implemented by a current flowback prevention system, according to one embodiment.

FIG. 5 is another flow diagram depicting an example active current flowback prevention routine illustratively implemented by a current flowback prevention system, according to one embodiment.

DETAILED DESCRIPTION OF SPECIFIC EMBODIMENTS

Figure 1:
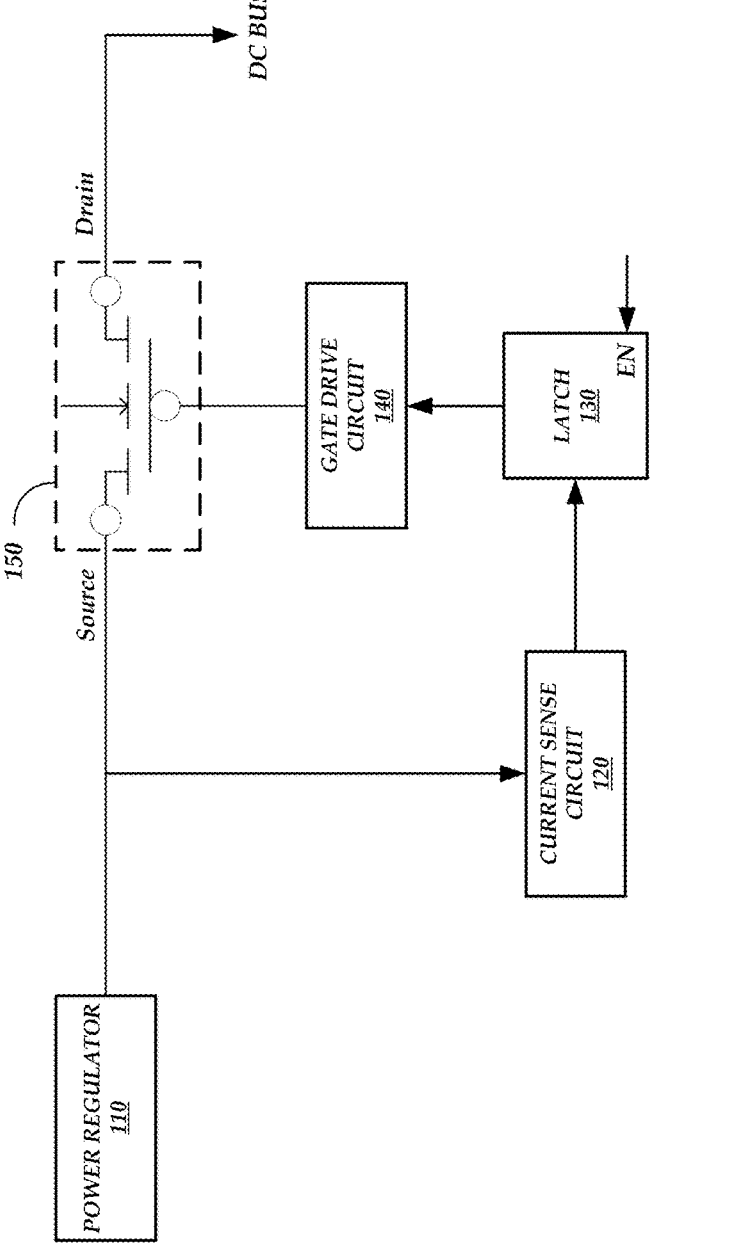
FIG. 1 is a block diagram of an illustrative short circuit prevention environment in which a power regulator transmits current toward a DC bus.
Figure 1:
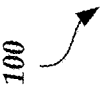

As described above, short circuits can damage electrical equipment. Previously, several methods have been used to mitigate the effects of short circuits. For example, one conventional method for mitigating the effects of short circuits is by using a circuit breaker that, when a short circuit is detected, trips and cuts off the circuit or electronic equipment that caused the short circuit from a power supply. A circuit breaker, however, can be slow to cut off the power supply, expensive to integrate into an existing electrical system, and large in size. A circuit breaker may therefore be impractical for electrical systems that include highly sensitive electronics for which a short circuit event would need to be mitigated within microseconds, for projects in which minimizing cost on short circuit prevention systems (e.g., systems that prevent the effects of short circuits from damaging equipment, such as a current flowback prevention system) is helpful in developing other mission critical components, and/or for use cases in which the space allocated for electrical components is limited (e.g., spacecraft, robotics, aviation, automotive, etc. where the device or vehicle within which the electrical components are located have a finite and/or strict form factor).

As another example, another conventional method for mitigating the effects of short circuits is by using back-to-back metal-oxide-semiconductor field-effect transistors (MOSFETs) or insulated-gate bipolar transistors (IGBTs). For example, the MOSFETs and/or IGBTs can be positioned between a driving circuit and a load. If a short circuit is detected in the driving circuit, the MOSFETs and/or IGBTs can be disabled to prevent a flow of current from the driving current to the load. MOSFETs and IGBTs, however, consume a large amount of power when compared to other types of transistors (such as Gallium Nitride transistors). For example, MOSFETs and/or IGBTs may consume double the amount of power as other types of transistors. This can be problematic if the electrical system in which a short circuit event is to be mitigated has a limited power supply and/or it is important to conserve power for use by other components (which may be especially true if the electrical system is embedded within a spacecraft or other type of vehicle). In addition, MOSFETs and/or IGBTs may not be radiation hardened. Thus, it may not even be possible to use such transistors in certain applications, such as applications in which the electrical systems may be exposed to high levels of radiation (e.g., which may happen in space with the electrical system of a spacecraft). Furthermore, even if MOSFETs and/or IGBTs could be used in an electrical system to mitigate short circuits, such transistors often have to be cooled properly during operation to avoid thermal runaway. Thus, additional physical components that consume additional power may be required to have the MOSFET and/or IGBT-based current flowback prevention systems operate properly.

Accordingly, described herein is an improved current flowback prevention device that uses a Gallium Nitride (GaN) device or transistor to mitigate the effects of short circuits. For example, a GaN device may have an ideal diode-like behavior during reverse conduction (e.g., during 3rd quadrant operation). This characteristic of the GaN device can be used to protect electrical systems against short circuit incidents caused by upstream circuits or electronic components. As an illustrative example, a power regulator (e.g., a fuel cell power regulator in an electric vehicle, such as a spacecraft, an automobile, a plane, a helicopter, a ship, a train, etc.) may be injecting current towards a direct current (DC) bus. While the power regulator is operating normally, a GaN device positioned between the power regulator and the DC bus may be operating in the 3rd quadrant. The gate of the GaN device may be kept high to allow current to pass through the GaN device from the power regulator to the DC bus and/or to prevent an excessive voltage drop.

A current sensing circuit may monitor the direction of current flowing from (or to) the power regulator toward (or from) the DC bus. If the current sensing circuit determines that the direction of current is from the power regulator to the DC bus, the current sensing circuit may continue to cause the gate of the GaN device to receive a high signal (and therefore keep the GaN device on). However, if the current sensing circuit determines that the direction of current has reversed and now flows from the DC bus to the power regulator, this may indicate that a short circuit has occurred in the power regulator or an electrical component upstream of the power regulator. In response, the current sensing circuit may cause the gate of the GaN device to no longer receive a high signal (e.g., to receive a low signal). The GaN device may then switch into operating in a 1st quadrant, where the GaN device may prevent current from passing through the GaN device. Thus, the power regulator may be detached from the DC bus, and therefore the damaged equipment (e.g., the power regulator) may not adversely affect other equipment that relies on the DC bus.

Use of the GaN device can provide several technical benefits over the use of circuit breakers, MOSFETs, and/or IGBTs to mitigate the effects of short circuit events. For example, the GaN device can respond quickly to changes in a signal driving the gate of the GaN device, including preventing the flow of current through the GaN device in less than 1 microsecond from the gate receiving a low signal. Thus, the GaN device is better equipped to prevent damage to sensitive electronic equipment that relies on the DC bus, such as equipment for which damage can occur if the delay in detaching the equipment from the power regulator is more than a microsecond. As an illustrative example, vehicles like spacecraft often include various mission-critical electronic equipment. Any damage to such equipment could result in a failure of the vehicle and/or loss of life. The GaN device can help reduce the likelihood that such damage occurs. As another example, GaN devices are cost effective and therefore can be implemented in projects in which minimizing cost on current flowback prevention systems is helpful in developing other mission critical components. As another example, GaN devices are lightweight and have a small form factor. Thus, GaN devices can be used even in use cases in which the space allocated for electrical components is limited. As another example, GaN devices produce lower conduction loss when compared to MOSFETs, IGBTs, or other semiconductor devices. Thus, current flowback prevention systems that use GaN devices may be more efficient and produce better thermal performance. Finally, GaN devices can be radiation hardened, and therefore can be used in electrical systems that may be exposed to high levels of radiation.

The foregoing aspects and many of the attendant advantages of this disclosure will become more readily appreciated as the same become better understood by reference to the following detailed description, when taken in conjunction with the accompanying drawings.

Example Current Flowback Prevention System

FIG. 1 is a block diagram of an illustrative short circuit prevention environment 100 in which a power regulator 110 transmits current toward a DC bus. A GaN device 150 may be positioned between the power regulator 110 and the DC bus. The short circuit prevention environment 100 may also include a current sense circuit 120, a latch 130, and a gate drive circuit 140. The current sense circuit 120, the latch 130, the gate drive circuit 140, and the GaN device 150 may collectively be referred to herein as a "current flowback prevention system" or a "GaN-based current flowback prevention system."

As illustrated in FIG. 1, a source of the GaN device 150 may be coupled to an output of the power regulator 110, and a drain of the GaN device 150 may be coupled to a DC bus. An input of the current sense circuit 120 may be coupled to the output of the power regulator 110 and the source of the GaN device 150 (e.g., directly or via one or more resistors, capacitors, diodes, etc.). The output of the current sense circuit 120 may be coupled to an input of the latch 130. The output of the latch 130 may be coupled to an input of the gate drive circuit 140 and/or to the gate of the GaN device 150 if the gate drive circuit 140 is not present. The output of the gate drive circuit 140, if present, may be coupled to the gate of the GaN device 150.

The current sense circuit 120 may be configured to detect a direction of current flowing between the output of the power regulator 110 and the source of the GaN device 150. If the direction of current flows from the output of the power regulator 110 to the source of the GaN device 150, this may indicate that the power regulator 110 is operating normally. In response to detecting that the direction of current flows from the output of the power regulator 110 to the source of the GaN device 150 (e.g., the current sense circuit 120 detects a positive shunt voltage value), the current sense circuit 120 may transmit a high signal (e.g., a signal at a voltage level above a threshold voltage value, such as a threshold voltage value that determines whether a signal is or is not a "1" bit) to the latch 130. The high signal provided as an input to the latch 130 may cause the latch 130 to output a high signal to the gate drive circuit 140 or the gate of the GaN device 150 if the gate drive circuit 140 is not present. The gate drive circuit 140, if present, may amplify the signal output by the latch 130 and use the amplified signal to drive the gate of the GaN device 150. If the gate of the GaN device 150 receives a high signal (or an amplified high signal), the GaN device 150 may operate in a 3rd quadrant and allow current to flow from the source of the GaN device 150 to the drain of the GaN device 150.

If the direction of current flows from the source of the GaN device 150 to the output of the power regulator 110, this may indicate that the power regulator 110 is malfunctioning (e.g., a short circuit event has occurred). In response to detecting that the direction of current flows from the source of the GaN device 150 to the output of the power regulator 110 (e.g., the current sense circuit 120 detects a negative shunt voltage value), the current sense circuit 120 may transmit a low signal (e.g., a signal at a voltage level below a second threshold voltage value (e.g., a voltage level of 0 volts), such as a second threshold voltage value that determines whether a signal is or is not a "0" bit) to the latch 130. The low signal provided as an input to the latch 130 may cause the latch 130 to output a low signal to the gate drive circuit 140 or the gate of the GaN device 150 if the gate drive circuit 140 is not present. The gate drive circuit 140, if present, may amplify the signal output by the latch 130 and use the amplified signal to drive the gate of the GaN device 150. Alternatively, the gate drive circuit 140, if present, may only amplify the signal output by the latch 130 if the signal output by the latch 130 has a voltage level above a threshold voltage level. If the gate of the GaN device 150 receives a low signal (or an amplified low signal, which still may have a voltage at or within a few mV of 0 volts), the GaN device 150 may operate in a 1st quadrant and prevent current from flowing from the drain of the GaN device 150 to the source of the GaN device 150 (and/or from the source of the GaN device 150 to the drain of the GaN device 150).

Optionally, the latch 130 may be a data latch. If the latch 130 is a data latch, the latch 130 may include an enable input. The current sense circuit 120 or another component (not shown) can transmit a high signal to the enable input constantly or in response to the current sense circuit 120 detecting a change in a direction of current flowing between the power regulator 110 and the source of the GaN device 150. Providing a high signal to the enable input may cause the latch 130 to output a signal that matches or otherwise corresponds with the signal provided as an input to the latch 130 (e.g., if the latch 130 receives a high signal as an input, the latch 130 may output a high signal, and if the latch 130 receives a low signal as an input, the latch 130 may output a low signal). Providing a low signal to the enable input may cause the latch 130 to continue to output the same signal as was previously output when the enable input last received a high signal (e.g., the latch 130 may continue to output a low or high signal).

The gate drive circuit 140 is optional and may be present in use cases in which the current flowback prevention system is being used in high power applications in which the output from the latch 130 may be insufficient to drive the gate of the GaN device 150.

As described herein, the current sense circuit 120 may output a low signal or a high signal based on a detected direction of flow of current between the power regulator 110 and the source of the GaN device 150. In this embodiment, the actual amount of current flowing between the power regulator 110 and the source of the GaN device 150 (e.g., the value of the current in amps) may not by itself affect the output of the current sense circuit 120. In alternative embodiments, the current sense circuit 120 can instead output a low signal or a high signal based on whether the amount of current flowing between the power regulator 110 and the source of the GaN device 150 does or does not exceed a threshold current level.

Figure 2:
FIG. 2 is a more detailed block diagram of the illustrative short circuit prevention environment located within an extraterrestrial vehicle.

FIG. 2 is a more detailed block diagram of the illustrative short circuit prevention environment 100 located within an extraterrestrial vehicle (e.g., a spacecraft, such as a space lander (e.g., a lander configured to land on a celestial body, such as a moon, a planet, an asteroid, etc.), a rover, a rocket, a satellite, a spaceship, a space shuttle, and/or any other type of vehicle that is capable of operating in space and/or on an extraterrestrial object other than Earth). As illustrated in FIG. 2, the source of the GaN device 150 may be coupled to a specific type of power regulator 110 (e.g., a fuel cell power regulator 210). In addition, the drain of the GaN device 150 may be coupled to a specific component that forms a part of the DC bus (e.g., a high voltage distribution box 260).

The current sense circuit 120 can be designed in one of many ways in order to provide the functionality described herein. One such design is depicted in FIG. 2. For example, the current sense circuit 120 may include a resistive current sensing circuit 222 and a microcontroller 224. The resistive current sensing circuit 222 may include a shunt resistor, one or more other resistors, one or more capacitors, and/or one or more amplifiers that can be used to determine a shunt voltage (e.g., a voltage across the shunt resistor). Dividing the shunt voltage by the resistance of the shunt resistance may yield the amount of current passing between the fuel cell power regulator 210 and the source of the GaN device 150. This division can be performed, for example, by the microcontroller 224. One input of the microcontroller 224 may receive the shunt voltage detected by the resistive current sensing circuit 222. The microcontroller 224 may be preconfigured to store a resistance of the shunt resistor. Upon receiving the shunt voltage from the resistive current sensing circuit 222, the microcontroller 224 may determine the amount of current passing between the fuel cell power regulator 210 and the source of the GaN device 150.

The microcontroller 224 may then determine the direction of the current flowing between the fuel cell power regulator 210 and the source of the GaN device 150. For example, the microcontroller 224 may store one or more previously determined current values for the current passing between the fuel cell power regulator 210 and the source of the GaN device 150. As one example, if the microcontroller 224 determines that the difference between a previously stored current value and a currently calculated current value is greater than a threshold current value and that the current value has increased, this may indicate that the current is flowing from the fuel cell power regulator 210 to the source of the GaN device 150. Thus, the microcontroller 224 may output, via a first output, a high signal to the input of the latch 130. Likewise, if the microcontroller 224 determines that the difference between a previously stored current value and a currently calculated current value is less than a threshold current value and that the current value has increased or decreased, this may indicate that the current is flowing in the same direction as previously determined. Thus, the microcontroller 224 may output, via the first output, the same signal to the input of the latch 130 that the microcontroller 224 previously output. Furthermore, if the microcontroller 224 determines that the difference between a previously stored current value and a currently calculated current value is greater than a threshold current value and that the current value has decreased, this may indicate that the current is flowing from the source of the GaN device 150 to the fuel cell power regulator 210. Thus, the microcontroller 224 may output, via the first output, a low signal to the input of the latch 130.

As a second example, if the microcontroller 224 determines that a previously stored current value was negative (or positive) and a currently calculated current value is positive, this may indicate that the current is flowing from the fuel cell power regulator 210 to the source of the GaN device 150.

Thus, the microcontroller 224 may output, via the first output, a high signal to the input of the latch 130. Likewise, if the microcontroller 224 determines that a previously stored current value was positive (or negative) and a currently calculated current value is negative, this may indicate that the current is flowing from the source of the GaN device 150 to the fuel cell power regulator 210. Thus, the microcontroller 224 may output, via the first output, a low signal to the input of the latch 130.

Optionally, the microcontroller 224 may output, via a second output, a low signal or high signal to the enable input of the latch 130. For example, the microcontroller 224 may output, via the second output, a high signal to the enable input constantly or in response to the microcontroller 224 outputting a new signal via the first output (e.g., the microcontroller 224 outputting a high signal via the first output when previously the microcontroller 224 output a low signal via the first output, the microcontroller 224 outputting a low signal via the first output when previously the microcontroller 224 output a high signal via the first output, etc.).

Figure 3:
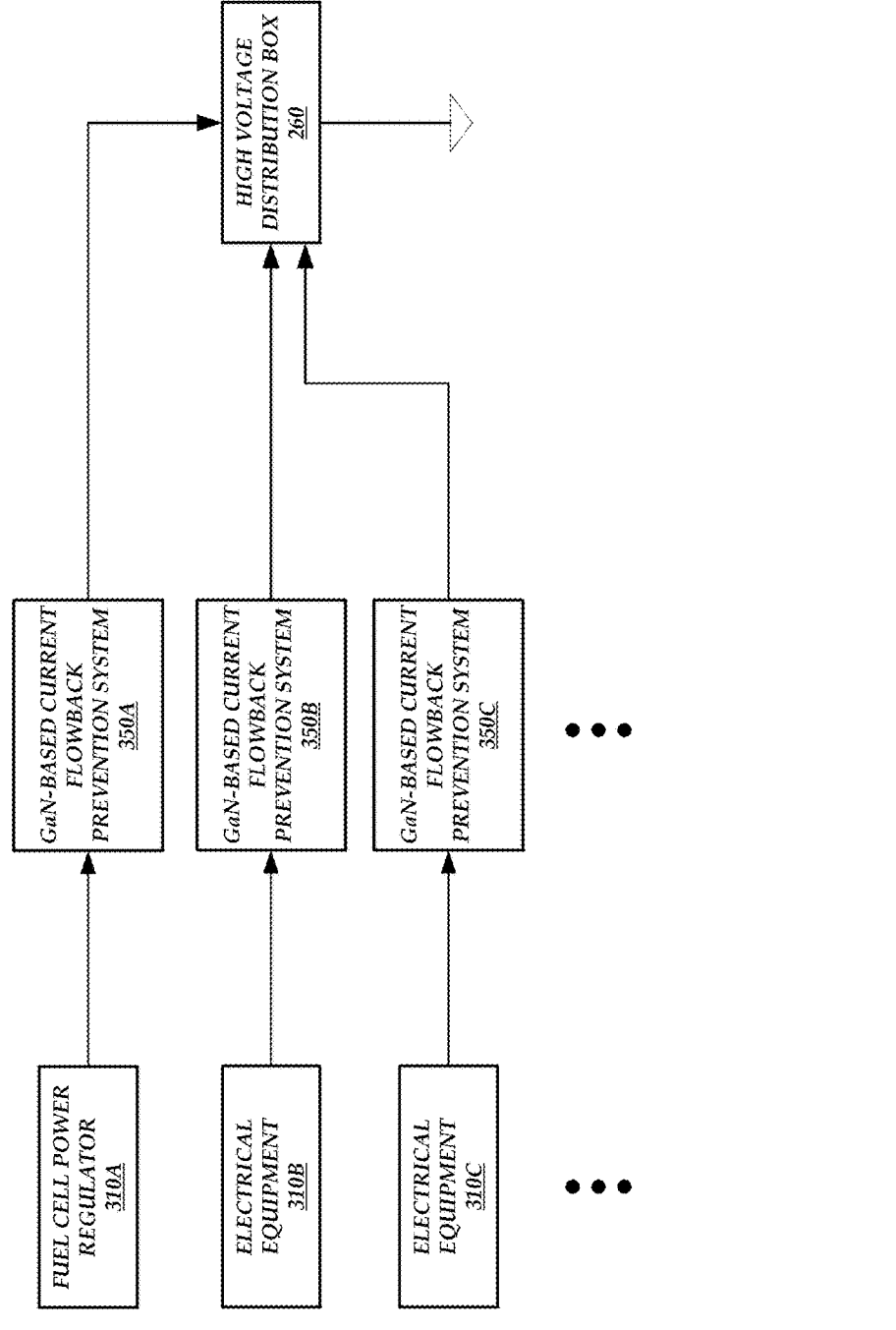
FIG. 3 is a block diagram of an illustrative electrical system in which multiple GaN-based current flowback prevention systems are present.

FIG. 3 is a block diagram of an illustrative electrical system 300 in which multiple GaN-based current flowback prevention systems 350A-C are present. For example, the electrical system 300 may be located within an extraterrestrial vehicle or any other type of vehicle (e.g., a train, a plane, an automobile, etc.).

As illustrated in FIG. 3, the electrical system 300 can include one or more electrical equipment 310A-C that are each coupled to the high voltage distribution box 260 via a separate GaN-based current flowback prevention system 350A-C. For example, the electrical equipment 310A-C can include power regulators, fuel cell power regulators, DC-to-DC converters, solar power sources, battery power sources, thermal control systems, and/or the like. Given the light-weight and small form-factor characteristics of the GaN devices 150 described herein, multiple GaN-based current flowback prevention systems 350A-C may be present in the electrical system 300 to prevent damage to the high voltage distribution box 260 or the DC bus in general that may be caused by a short circuit that affects one of several different electrical equipment 310A-C.

Each GaN-based current flowback prevention system 350A-C may include a current sense circuit 120, a latch 130, a gate drive circuit 140, and/or a GaN device 150. In typical operation, current may flow from the electrical equipment 310A-C to the high voltage distribution box 260. In this operation, the GaN-based current flowback prevention system 350A-C may allow the current to pass through in a manner as described herein. If any of the GaN-based current flowback prevention systems 350A-C detects a change in the flow of current such that the direction of current that is detected is to the electrical equipment 310A-C, the respective GaN-based current flowback prevention system 350A-C may stop the flow of current in a manner as described herein.

Example Active Current Flowback Prevention Routines

FIG. 4 is a flow diagram depicting an example active current flowback prevention routine 400 illustratively implemented by a current flowback prevention system, according to one embodiment. As an example, the current sense circuit 120 of a current flowback prevention system (e.g., the GaN-based current flowback prevention system 350A-C) of FIG. 1 can be configured to execute the active current flowback prevention routine 400. The active current flowback prevention routine 400 begins at block 402.

At block 404, a direction of current from a power regulator is detected. For example, the direction of the current from the power regulator may be positive and toward a DC bus.

At block 406, a gate of a GaN device is caused to be driven in response to detecting that the direction of current from the power regulator is in a direction of a source of the GaN device (and toward a DC bus). For example, the gate of the GaN device may be driven by a high signal or an amplified high signal.

At block 408, a second direction of the current from the power regulator is detected. For example, the second direction of the current from the power regulator may be negative and away from the DC bus.

At block 410, the gate of a GaN device is caused to no longer be driven in response to detecting that the second direction of current from the power regulator is in a direction away from the source of the GaN device (and away from the DC bus). For example, the gate of the GaN device may not be driven and/or be driven by a low signal or an low high signal. Causing the gate of the GaN device to no longer be driven may prevent the flowback of current toward the power regulator. Once the gate of the GaN device is caused to no longer be driven, the active current flowback prevention routine 400 ends, as shown at block 412.

FIG. 5 is another flow diagram depicting an example active current flowback prevention routine 500 illustratively implemented by a current flowback prevention system, according to one embodiment. As an example, the current sense circuit 120 of a current flowback prevention system (e.g., the GaN-based current flowback prevention system 350A-C) of FIG. 1 can be configured to execute the active current flowback prevention routine 500. The active current flowback prevention routine 500 begins at block 502.

At block 504, a direction of current output by electrical equipment is detected. For example, the direction of the current output by the electrical equipment may be positive and toward a DC bus. The electrical equipment can include any type of equipment that can output a flow of current, such as a power regulator.

At block 506, a gate of a GaN device is caused to be driven in response to detecting that the direction of current output by the electrical equipment is in a direction of a source of the GaN device (and toward a DC bus). For example, the gate of the GaN device may be driven by a high signal or an amplified high signal.

At block 508, a change in a direction of the current output by the electrical equipment is detected. For example, the change in the direction of the current output by the electrical equipment may be from toward the DC bus to away from the DC bus.

At block 510, the gate of a GaN device is caused to no longer be driven. For example, the gate may no longer be driven in response to detecting the change in the direction of the current output by the electrical equipment. For example, the gate of the GaN device may not be driven and/or be driven by a low signal or an low high signal. Causing the gate of the GaN device to no longer be driven may prevent the flowback of current toward the electrical equipment. Once the gate of the GaN device is caused to no longer be driven, the active current flowback prevention routine 500 ends, as shown at block 512.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for preventing current flowback, the system comprising:

a Gallium Nitride (GaN) device comprising a source, a drain, and a gate;

electrical equipment, wherein an output of the electrical equipment is coupled to the source of the GaN device;

a latch, wherein an output of the latch is coupled to the gate of the GaN device; and a current sense circuit, wherein an output of the current sense circuit is coupled to a first input of the latch, wherein an input of the current sense circuit is coupled to the output of the electrical equipment and the source of the GaN device, and wherein the current sense circuit is configured to:

detect a direction of current output by the electrical equipment; and output a low signal to the first input of the latch and a high signal to a second input of the latch to cause the latch to output a second low signal that causes the GaN device to prevent a flow of current from the drain of the GaN device to the source of the GaN device in response to detecting that the direction of current output by the electrical equipment is from the source of the GaN device to the output of the electrical equipment.

2. The system of claim 1, further comprising a gate drive circuit, wherein the gate drive circuit is coupled between the output of the latch and the gate of the GaN device, wherein the gate drive circuit is configured to amplify the second low signal output by the latch and output the amplified second low signal to the gate of the GaN device.

3. The system of claim 1, wherein the second input comprises an enable input.

4. The system of claim 1, wherein the current sense circuit is further configured to:

detect that a second direction of the current output by the electrical equipment is from the output of the electrical equipment to the source of the GaN device at a first time before a time at which the direction of the current is detected; and cause the latch to drive the gate of the GaN device, wherein driving the gate of the GaN device causes the GaN device to allow the current to flow from the source of the GaN device to the drain of the GaN device.

5. The system of claim 1, wherein the drain of the GaN device is coupled to a high voltage distribution box.

6. The system of claim 1, wherein the second low signal has a voltage level that falls below a threshold voltage level.

7. The system of claim 1, wherein the electrical equipment comprises a power regulator.

8. The system of claim 7, wherein the power regulator comprises a fuel cell power regulator.

9. The system of claim 1, wherein the system is comprised within one of a spacecraft, an automobile, a train, a plane, or a ship.

10. A method for preventing current flowback, the method comprising:

detecting a first direction of current from a power regulator, wherein an output of the power regulator is coupled to a source of a Gallium Nitride (GaN) device;

causing a gate of the GaN device to be driven in response to detecting that the direction of current from the power regulator is in a direction of the source of the GaN device;

detecting a second direction of the current from the power regulator; and outputting a low signal to a first input of a latch and a high signal to a second input of the latch to cause the gate of the GaN device to no longer be driven in response to detecting that the second direction of the current from the power regulator is in a direction away from the source of the GaN device.

11. The method of claim 10, wherein outputting a low signal to a first input of a latch and a high signal to a second input of the latch further comprises causing the latch coupled to the gate of the GaN device to output the low signal below a threshold voltage level.

12. The method of claim 11, wherein causing the latch coupled to the gate of the GaN device to output the low signal further comprises causing a gate drive circuit coupled between the output of the latch and the gate of the GaN device to amplify the low signal output by the latch and output the amplified low signal to the gate of the GaN device.

13. The method of claim 10, wherein the second input of the latch comprises an enable input.

14. The method of claim 13, wherein the latch is configured to output the high signal to the gate of the GaN device.

15. The method of claim 10, wherein a drain of the GaN device is coupled to a high voltage distribution box.

16. The method of claim 10, wherein the power regulator comprises a fuel cell power regulator.

17. The method of claim 10, wherein the power regulator and the GaN device are comprised within one of a spacecraft, an automobile, a train, a plane, or a ship.

18. A method for preventing current flowback, the method comprising:

detecting a direction of current output by electrical equipment, wherein an output of the electrical equipment is coupled to a source of a Gallium Nitride (GaN) device;

causing a gate of the GaN device to be driven in response to detecting that the direction of the current output by the electrical equipment is in a direction of the source of the GaN device;

detecting a change in the direction of the current output by the electrical equipment; and outputting a low signal to a first input of a latch and a high signal to a second input of the latch to cause the gate of the GaN device to no longer be driven.

19. The method of claim 18, wherein outputting a low signal to a first input of a latch and a high signal to a second input of the latch further comprises causing the latch coupled to the gate of the GaN device to output the low signal below a threshold voltage level.

20. The method of claim 18, wherein the electrical equipment and the GaN device are comprised within one of a spacecraft, an automobile, a train, a plane, or a ship.

* * * * *